(12) United States Patent
Miki

(10) Patent No.: US 7,703,829 B2
(45) Date of Patent: Apr. 27, 2010

(54) INSTRUMENT PANEL ENERGY TRANSFERRING SYSTEM

(75) Inventor: Jeffrey Sadao Miki, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/013,103

(22) Filed: Jan. 11, 2008

(65) Prior Publication Data

US 2009/0179411 A1    Jul. 16, 2009

(51) Int. Cl.
    *B60R 21/045*    (2006.01)
(52) U.S. Cl. ............ 296/72; 296/70; 296/193.02; 280/748; 280/752
(58) Field of Classification Search ............ 296/70, 296/37.12, 193.02, 72, 74; 280/752, 748, 280/751
    See application file for complete search history.

(56) References Cited

U.S. PATENT DOCUMENTS

| | | | |
|---|---|---|---|
| 5,951,045 A * | 9/1999 | Almefelt et al. | 280/748 |
| 6,196,588 B1 | 3/2001 | Sugawara et al. | |
| 6,213,504 B1 | 4/2001 | Isano et al. | |
| 6,296,277 B1 * | 10/2001 | Bittinger et al. | 280/748 |
| 6,299,208 B1 * | 10/2001 | Kasahara et al. | 280/752 |
| 6,837,518 B2 | 1/2005 | Mullan et al. | |
| 6,921,128 B2 * | 7/2005 | Davis et al. | 296/193.02 |
| 2003/0173763 A1 * | 9/2003 | Yamazaki et al. | 280/748 |
| 2005/0264040 A1 | 12/2005 | Bailey et al. | |
| 2006/0232055 A1 * | 10/2006 | Cappabianca et al. | 280/752 |
| 2007/0182189 A1 * | 8/2007 | Penner | 296/37.12 |

FOREIGN PATENT DOCUMENTS

| | | |
|---|---|---|
| DE | 102006016607 | 10/2007 |
| JP | 2002362415 | 12/2002 |
| JP | 2004231033 | 8/2004 |

* cited by examiner

*Primary Examiner*—Patricia L Engle
*Assistant Examiner*—Sunsurraye Westbrook
(74) *Attorney, Agent, or Firm*—Gifford, Krass, Sprinkle, Anderson & Citkowski, P.C.

(57) ABSTRACT

An energy transferring system for transferring energy from an occupant's knees through an instrument panel assembly to a vehicle cross beam when an occupant's knee drives the instrument panel assembly into the cross beam as a result of an external load placed on the vehicle. The system having an elongated member projecting from the cross beam towards the instrument panel assembly, and an instrument panel assembly having an energy transferring member and a recess registered to said elongated member. Said elongated member and recess working in concert to prevent said cross beam from slipping past said energy transferring member thereby increasing the energy transferring from an occupant's knees to other vehicle structures.

3 Claims, 5 Drawing Sheets

006
INSTRUMENT PANEL ENERGY TRANSFERRING SYSTEM

BACKGROUND OF THE INVENTION

1. Field of the Invention

The present invention relates generally to a system for transferring energy through an instrument panel assembly to a vehicle cross beam when an occupant's knee forces the instrument panel assembly into contact with the cross beam as a result of an external load on the vehicle. Specifically, an elongated member and a recess work in concert to prevent the cross beam from slipping past an energy transferring member disposed on the instrument panel assembly and thus reducing the energy transferring qualities thereof.

2. Description of the Prior Art

A system for mitigating impact on an occupant's knee when an external load forces the knee into an instrument panel assembly is well documented. Such systems attempt to either absorb the energy in the instrument panel assembly itself or transfer the energy to other noncritical vehicle structures such as the door, floor, or the cross beam. However such systems require the addition of material and can therefore increase the cost of production. Furthermore, prior art does not show a system for preventing a cross beam from slipping past an instrument panel assembly.

U.S. Pub. No. 20070182189 discloses a glove compartment assembly mounted to an instrument panel which dissipates energy when the glove compartment is subjected to force from an occupant's knee. The publication teaches a deformable glove compartment box that dissipates energy from the knee impact by incorporating a deformable lid lined with a honey comb structure incorporated therein and by having the structural projection impact the cross beam. The structural projection has an arcuate profile which is designed to engage a cross beam having a circular shape.

German Patent No. DE102006016607 to Biesdorf et al. discloses a U-shaped reinforcement plate disposed near a vehicle cross bean that guides the energy in the cross beam during a side collision. The U-shaped reinforcement plat has corrugations for converting impact energy from a side collision into deformation energy.

U.S. Pat. No. 6,921,128 to Davis, Jr. et al. discloses a pair of energy absorbing brackets capable of holding a cross beam. The brackets are spaced apart from each other and have a U-Shaped portion in which the cross beam is placed. Davis, Jr. et al. teaches a pair of universal brackets capable of being mounted on cross beams of a number of different vehicle lines for supporting different knee and glove box configurations.

U.S. Pat. No. 6,196,588 to Sugawara discloses a knee guard disposed between the instrument panel and cross beam. The knee guard is a U-shaped bracket. The bracket engages the cross beam and abuts the instrument panel. Specifically, the ends of each bracket are connected to the cross beam and the base of the bracket is in contact with the interior of the instrument panel. The brackets are fitted with a folding portion which crumples under a predetermined force of a knee impact.

SUMMARY OF THE INVENTION AND ADVANTAGES

A system for transferring energy from an occupant's knees through an instrument panel assembly to a vehicle cross beam when an occupant's knee drives the instrument panel assembly into the cross beam as a result of an external load placed on the vehicle. In particular, the system includes an elongated member disposed on the cross beam. The elongated member extends outwardly from the cross beam towards the instrument panel assembly. An energy transferring member is disposed on the instrument panel assembly opposite the cross beam. A recess is also disposed on the instrument panel assembly and is registered to the elongated member. Accordingly, as an occupant's knees drive the instrument panel assembly forward, the energy transferring member engages the cross beam. At the same time, the elongated member is inserted into the recess and prevents the cross beam from slipping past a portion of the instrument panel assembly. Thus the elongated member and the recess work in concert to keep the cross beam in contact with the energy absorbing member and increases the energy transferring capabilities of the instrument panel assembly. Efficient energy transfer in the event of a knee impact reduces the load placed on the knee thereby mitigating injury to the occupant.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
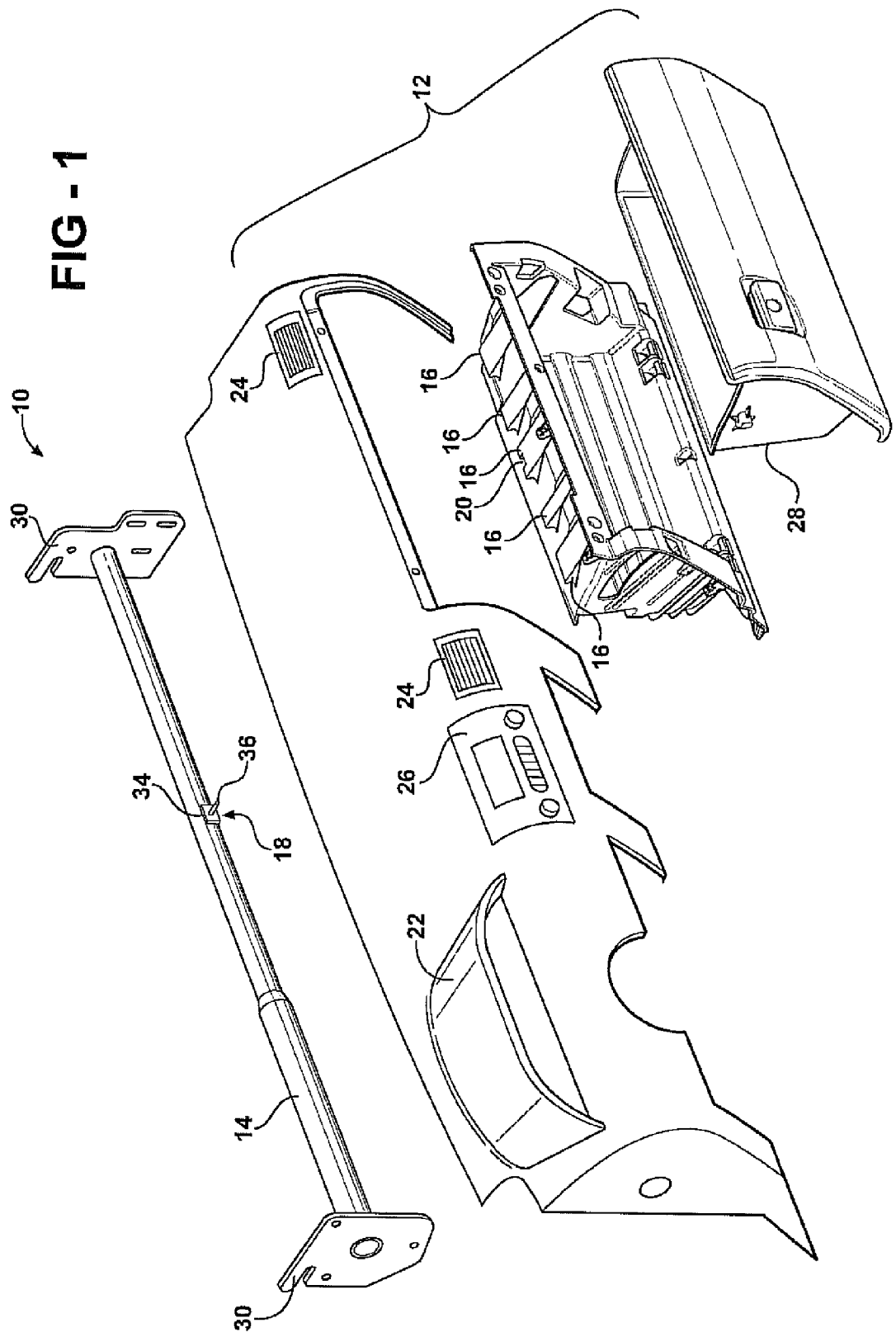
FIG. 1 is an exploded view of an embodiment of the present invention showing the vehicle cross beam having an elongated member, and an instrument panel assembly wherein said instrument panel assembly is fitted with a plurality of energy transferring members, and a recess, said recess being registered to said elongated member.

Referencing now FIG. 1, a system 10 for transferring energy through an instrument panel assembly 12 to a vehicle cross beam 14 when an occupant's knee impacts the instrument panel assembly 12 as a result of an external load placed on the vehicle is provided. The energy transferring system 10 has an energy transferring member 16 disposed on the instrument panel assembly 12, an elongated member 18 projecting from the cross beam 14, and a recess 20 for receiving the cross beam 14. As will be subsequently described in further detail, the system 10 has the utility of transferring energy from an occupant's knee when the knee impacts the instrument panel assembly 12 by preventing the cross beam 14 from slipping past the instrument panel assembly 12. Thus the cross beam 14 remains in contact with the energy transferring member 16 which in turn increases the energy transferring and absorbing abilities of the instrument panel assembly 12.

Referring again to FIG. 1, the instrument panel assembly 12 generally references the vehicle dashboard, and includes various vehicle components such as an instrument panel hood 22, HVAC vents 24, a radio 26, a glove box 28 and the like. FIG. 1 is an exploded view of the instrument panel assembly 12 and the vehicle cross beam 14. The vehicle cross beam 14 is made of a rigid material and extends across the width of the vehicle. The cross beam 14 is located underneath the hood of the vehicle and forward of die instrument panel assembly 12.

Figure 3:
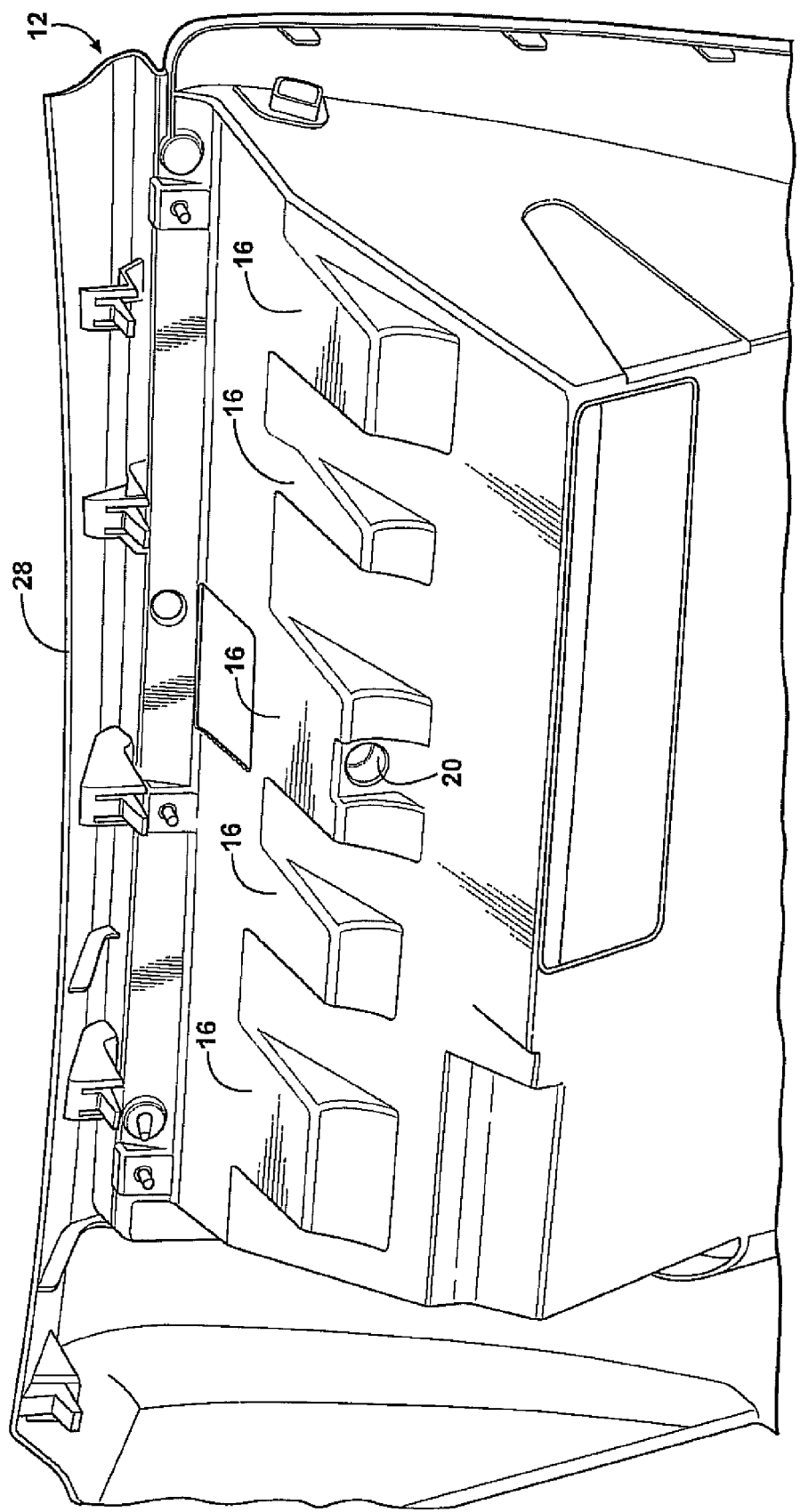
FIG. 3 is an view of FIG. 2 without the cross beam.

With reference to FIG. I, the cross beam 14 includes a first end and second end brackets 30. The brackets 30 may be welded to the cross beam 14 or integrally formed thereto. The vehicle cross beam 14 is secured at each end to the vehicle frame (not shown) by the brackets 30 and provides structural support to the vehicle as well as a platform upon which to mount the various vehicle components described above, including the instrument panel assembly 12. As shown in FIG. 3, the vehicle is configured such that the cross beam 14 is spaced apart from the instrument panel.

As mentioned above the instrument panel assembly 12 is disposed rearward of the cross beam 14 with respect to the vehicle. Accordingly, an occupant's knee may impact the instrument panel assembly 12 as a result of an external load placed upon the vehicle. In such an occurrence, the impact of the knee may force a portion of the instrument panel assembly 12 into the cross beam 14. Transferring energy to other vehicle structures may help mitigate any damage to the occupant's knees during such an impact. To facilitate and enhance such an energy transfer, an energy transferring member 16 is fitted onto the portion of the instrument panel assembly 12 opposite the cross bar, as shown in FIGS. 1, 2, 3, and 4. With particular reference to FIG. 3, the instrument panel assembly 12 is fitted with a plurality of energy transferring members 16. Each energy transferring member 16 is designed to engage the cross beam 14 in the event the instrument panel assembly 12 is forced into contact therewith. For illustrative purposes only, the energy transferring member 16 is shown disposed on the forward portion of a glove box 28 compartment, however, it is anticipated that the energy transferring member 16 may be disposed on other instrument panel assembly 12 components disposed opposite the cross beam 14. However, it is anticipated that the instrument panel assembly 12 may be fitted with only one energy transferring member 16, or that the energy transferring member 16 extends laterally along the instrument panel assembly 12.

Figure 2:
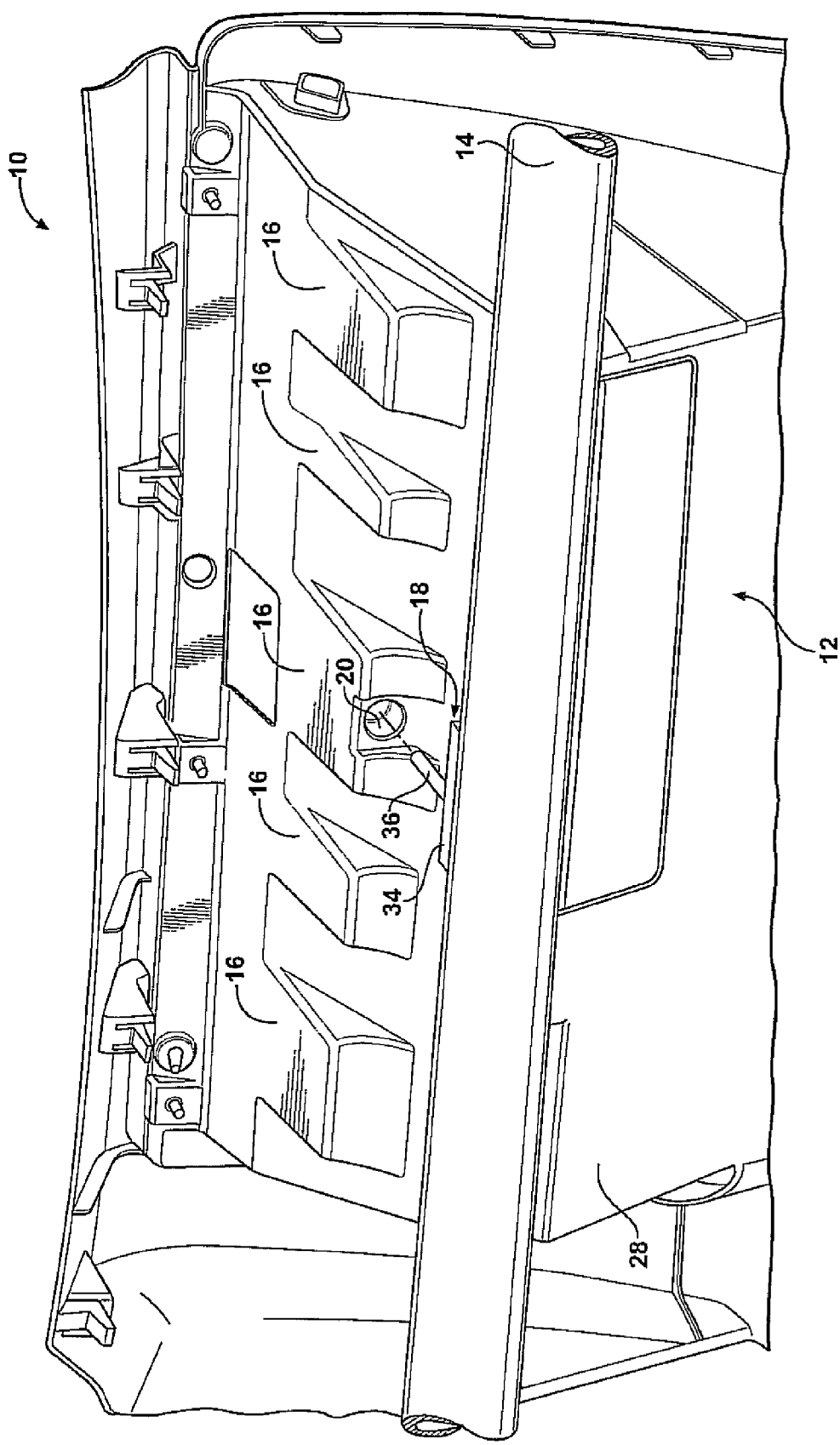
FIG. 2 is an isolated view of the interior side of a portion of the instrument panel assembly described above spaced apart from the cross beam, specifically, energy transferring members are shown disposed on a glove box of the instrument panel assembly, and the cross beam is shown having the elongated member, the dashed line indicates the elongated member being registered to the recess.
Figure 4:
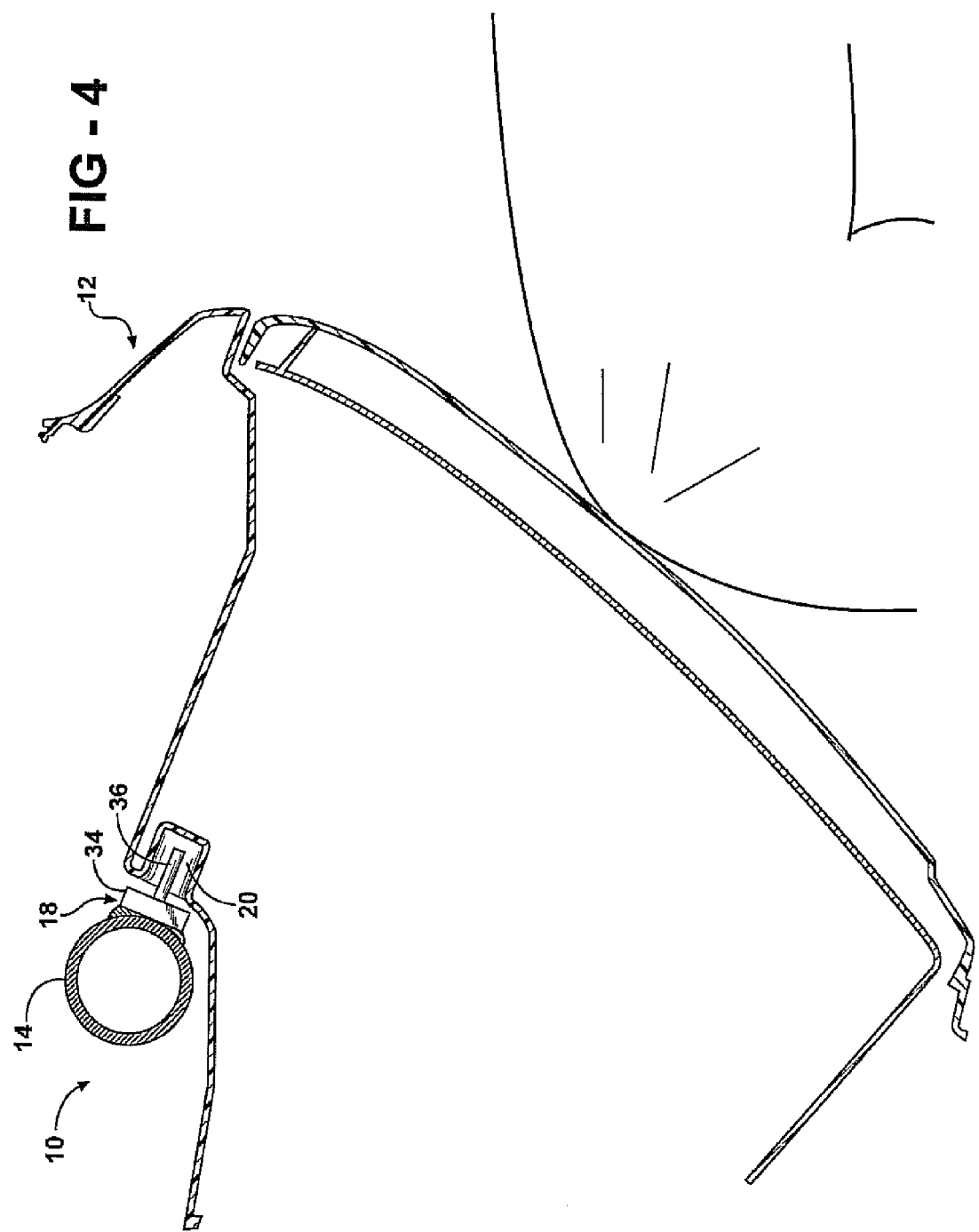
FIG. 4 is a cross sectional view of the cross beam and the instrument panel assembly taken along the recess, as shown, the recess is pushed forward and registers with the elongated member when an occupant knee impacts the instrument panel assembly.

With reference to FIGS. 2 and 4, the energy transferring member 16 is shown having a face opposite the cross beam 14. The face presents a profile reciprocating the dimensions of the cross beam 14 to help hold the cross beam 14 in position when contact between the two elements are made. As such, if the cross beam 14 has a rectangular shaped body, the cross beam 14 would have a generally U-shaped profile. In the embodiment provided, the cross beam 14 has a circular shaped profile and thus the energy transferring member 16 shown has an arcuate profile.

Figure 5:
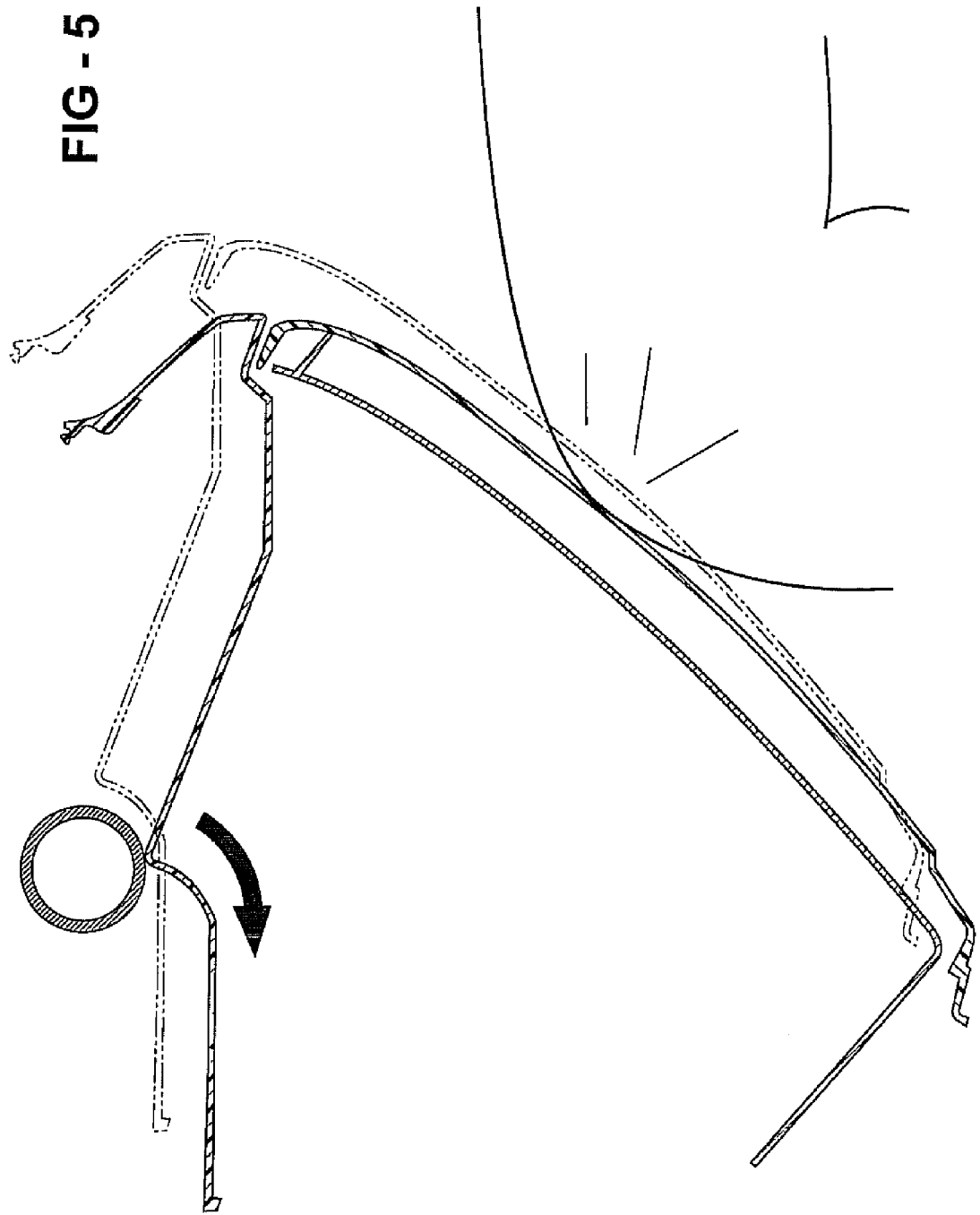
FIG. 5 is a cross sectional view of the cross beam and the instrument panel assembly taken along an instrument panel not having the elongated member nor the recess, as shown the force from a knee impact may cause the cross beam to slip past a portion of the instrument panel assembly.

When an external load placed on the vehicle forces a vehicle occupant's knees into the instrument panel assembly 12, and the knee forces the instrument panel assembly 12 into contact with the cross beam 14, the cross beam 14 engages the energy transferring member 16. The energy from such an impact is dissipated along the energy transferring member 16 and along the cross beam 14 to mitigate damage to the occupant's knees. However, the impact from the occupant's knees may cause the instrument panel assembly 12 to move forward of the cross beam 14, i.e. the cross beam 14 slips past/over the portion of the instrument panel opposite the cross beam 14, as shown in FIG. 5.

To further the energy absorbing qualities of the above mentioned instrument panel assembly 12, an elongated member 18 is provided to work in concert with a recess 20 to prevent the cross beam 14 from slipping past the instrument panel assembly 12. The elongated member 18 may be either fixed to the cross beam 14 or integrally formed thereon. The elongated member 18 extends outwardly from the cross beam 14 towards the portion of the instrument panel assembly 12 having the energy transferring member 16. FIGS. 1, 2, and 4 show the elongated member 18 having a base 32 welded to the cross beam 14, and a finger 34 projecting from the base 32. However, it is anticipated that the elongated member 18 may take on other embodiments such as a stud (not shown) or a bolt (not shown).

FIGS. 1, 2, 3 and 4 show a recess 20 disposed along the same longitudinal axis and adjacent to an energy transferring member 16. The recess 20 is registered to the elongated member 18 such that the elongated member 18 is inserted therein in the event that the instrument panel assembly 12 is forced into contact with the cross beam 14, as shown in FIGS. 2 and 3. The cross beam 14 is prevented from slipping past the instrument panel assembly 12 by virtue of the elongated member 18 being caught/held in the recess 20. This catching feature further directs the cross beam 14 to maintain contact with the energy transferring member 16 enabling the instrument panel assembly 12 to further transfer energy from an occupant's knee along the cross beam 14 and other structural components of the vehicle. In another embodiment, the recess 20 may be formed on the energy transferring member 16 itself. In such an embodiment, the recess 20 is still registered with the elongated member 18.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A system for transferring energy through an instrument panel assembly to a vehicle cross beam when the instrument panel assembly is subjected to a load, the system comprising:
   an elongated member extending radially from the cross beam, the elongated member having a base mounted to the cross beam, and a free end;
   an energy transferring member attached to the instrument panel, assembly opposite the cross beam, the energy transfer member having a portion for engaging the cross beam, wherein the energy transfer member is spaced apart from the free end of the elongated member; and
   the instrument panel assembly having a recess, wherein the recess is spaced apart and registered to the elongated member, wherein the free end of the elongated member is pushed through said recess and the body of the elongated member engages the recess upon a predetermined load so as to prevent the cross beam from slipping off the energy transfer member.

2. A system as set forth in claim 1, wherein the energy transferring member is integrally formed to the instrument panel assembly and includes a face having a contact surface configured to engage the cross beam.

3. A system as set forth in claim 2, wherein the recess is disposed on the energy transferring member.

* * * * *

UNITED STATES PATENT AND TRADEMARK OFFICE
CERTIFICATE OF CORRECTION

PATENT NO.         : 7,703,829 B2
APPLICATION NO. : 12/013103
DATED              : April 27, 2010
INVENTOR(S)        : Jeffrey Sadao Miki It is certified that error appears in the above-identified patent and that said Letters Patent is hereby corrected as shown below:

Column 3 Line 9 replace "die" with --the--

Signed and Sealed this

Fourteenth Day of September, 2010

David J. Kappos
*Director of the United States Patent and Trademark Office*